United States Patent
Mueller et al.

(10) Patent No.: US 11,828,010 B2
(45) Date of Patent: Nov. 28, 2023

(54) KNITTED SPACER FABRIC FOR USE AS HEATING ELEMENT

(71) Applicants: Stefan Mueller, Wiehl (DE); Joachim Weis, Rauschenberg (DE)

(72) Inventors: Stefan Mueller, Wiehl (DE); Joachim Weis, Rauschenberg (DE)

(73) Assignee: MUELLER TEXTIL GMBH, Wiehl-Drabenderhoehe (DE)

( * ) Notice: Subject to any disclaimer, the term of this patent is extended or adjusted under 35 U.S.C. 154(b) by 754 days.

(21) Appl. No.: 16/790,790

(22) Filed: Feb. 14, 2020

(65) Prior Publication Data

US 2020/0263334 A1 Aug. 20, 2020

(30) Foreign Application Priority Data

Feb. 15, 2019 (DE) .................... 102019103934.7

(51) Int. Cl.
*D04B 21/14* (2006.01)

(52) U.S. Cl.
CPC .......... *D04B 21/14* (2013.01); *D10B 2401/16* (2013.01); *D10B 2403/021* (2013.01); *D10B 2505/08* (2013.01)

(58) Field of Classification Search
CPC ........ D04B 21/14; D04B 21/20; D04B 21/00; D10B 2401/16; D10B 2403/021; D10B 2505/08; H05B 3/34; H05B 3/48; H05B 2203/029; H05B 2203/004; H05B 3/345; H05B 2203/017; B60R 21/0154; A47K 13/30; A47K 13/305; B60H 1/00285; Y10S 4/06

See application file for complete search history.

(56) References Cited

U.S. PATENT DOCUMENTS

| | | | | |
|---|---|---|---|---|
| 2010/0258334 A1* | 10/2010 | Akaike | .................. | H05K 1/038 |
| | | | | 174/126.1 |
| 2017/0071032 A1* | 3/2017 | Mueller | .................. | H05B 3/345 |

FOREIGN PATENT DOCUMENTS

| | | | | | |
|---|---|---|---|---|---|
| CN | 201905231 U | * | 7/2011 | | |
| DE | 4239068 B | | 3/1996 | | |
| DE | 102006038612 A | | 2/2006 | | |
| DE | 102007054543 A | | 5/2009 | | |
| DE | 102009010415 A1 | * | 9/2009 | .......... | A47C 31/006 |
| DE | 102009013250 A | | 7/2010 | | |
| DE | 102009013250 B3 | * | 7/2010 | ............. | D04B 21/14 |
| EP | 1881097 A2 | * | 1/2008 | ............. | D03D 27/10 |
| EP | 2456282 A1 | * | 5/2012 | ............... | D04B 1/14 |
| JP | 2003217802 A | * | 7/2003 | | |
| JP | 2011074537 A | * | 4/2011 | | |

* cited by examiner

*Primary Examiner* — Jennifer A Steele
(74) *Attorney, Agent, or Firm* — Andrew Wilford

(57) ABSTRACT

A knitted spacer fabric has a first warp-knitted layer having wales running in a production direction and rows of stitches extending in a transverse direction, a second warp-knitted layer also having wales running in a production direction and rows of stitches extending in a transverse direction. Spacer yarns connect the knitted layers, and at least one of the knitted layers are composed of nonconductive yarns and conductive yarns. The conductive yarns are incorporated into the one knitted layer in some areas in a functional region extending in a production direction and resting on the respective knitted layer in a connection region that extends over a plurality of rows of stitches as a float stitch.

16 Claims, 7 Drawing Sheets

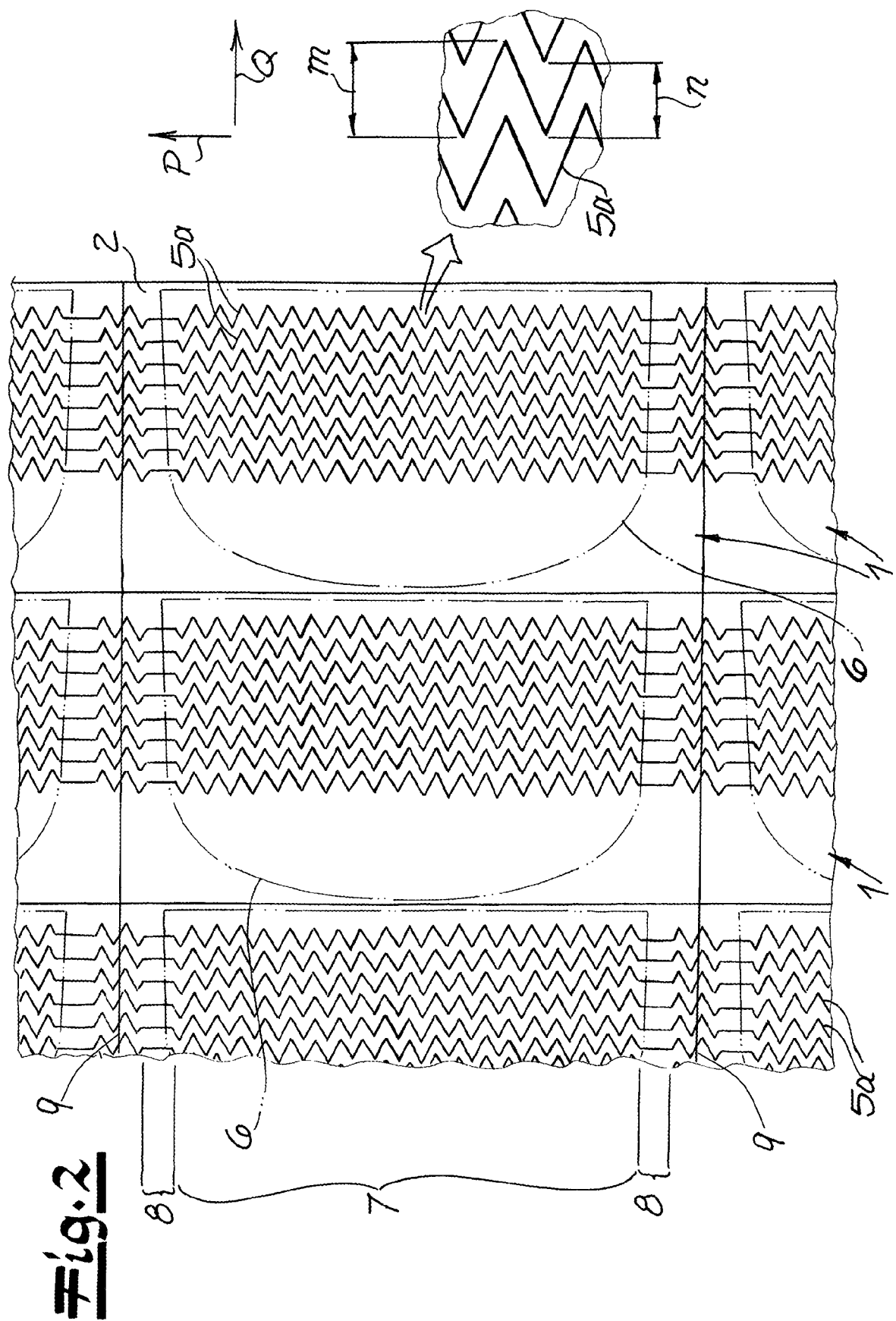

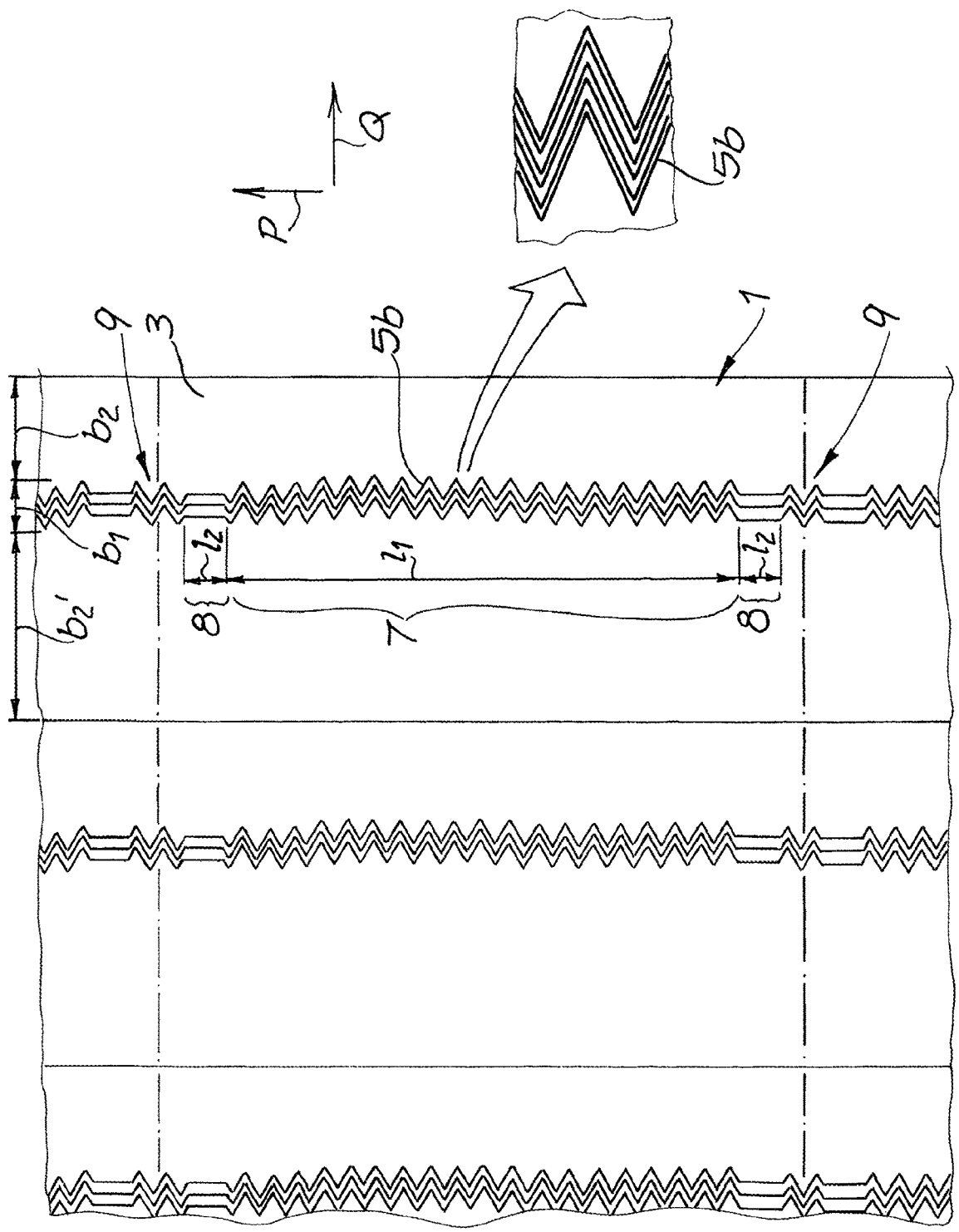

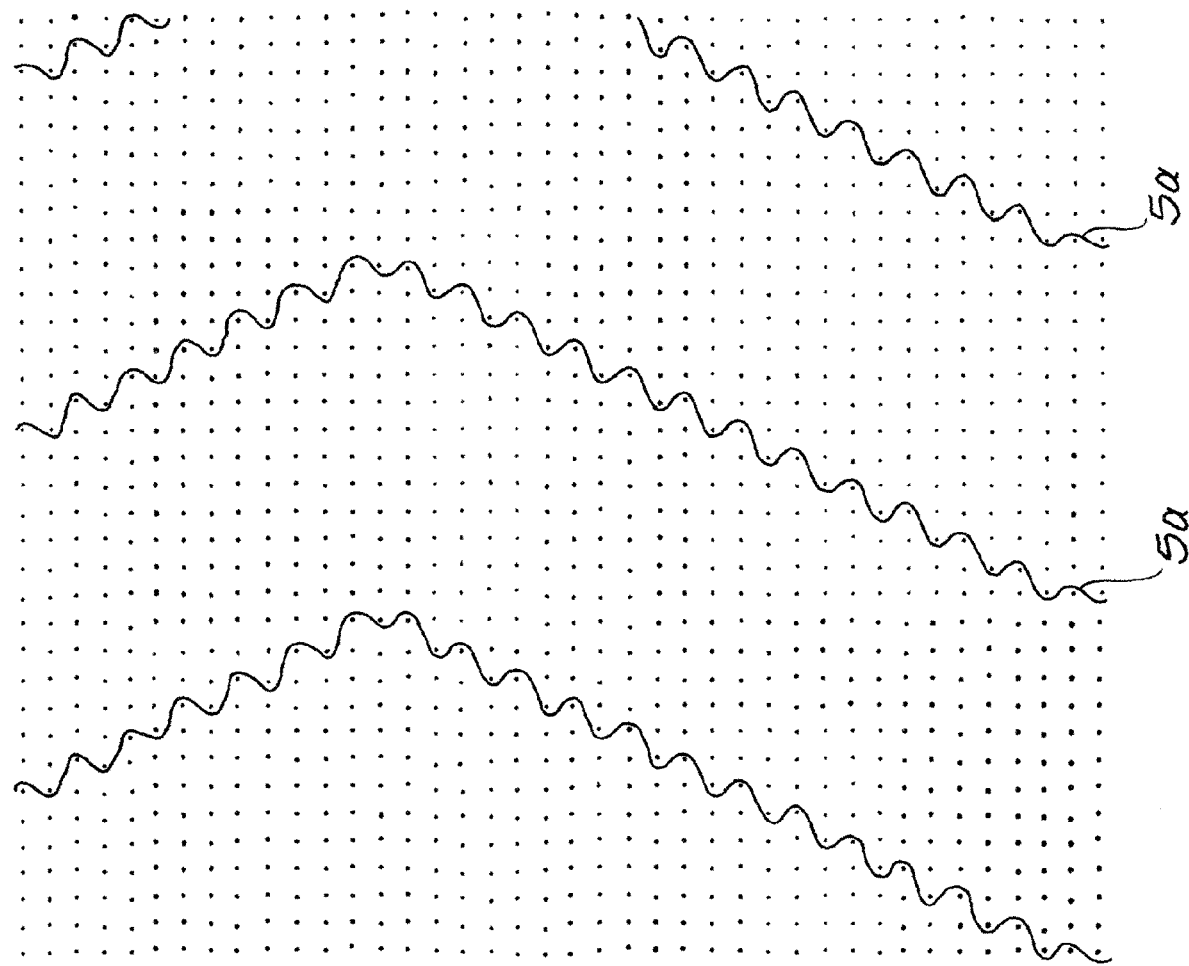
Fig. 4E
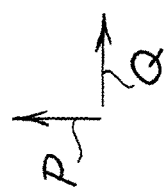

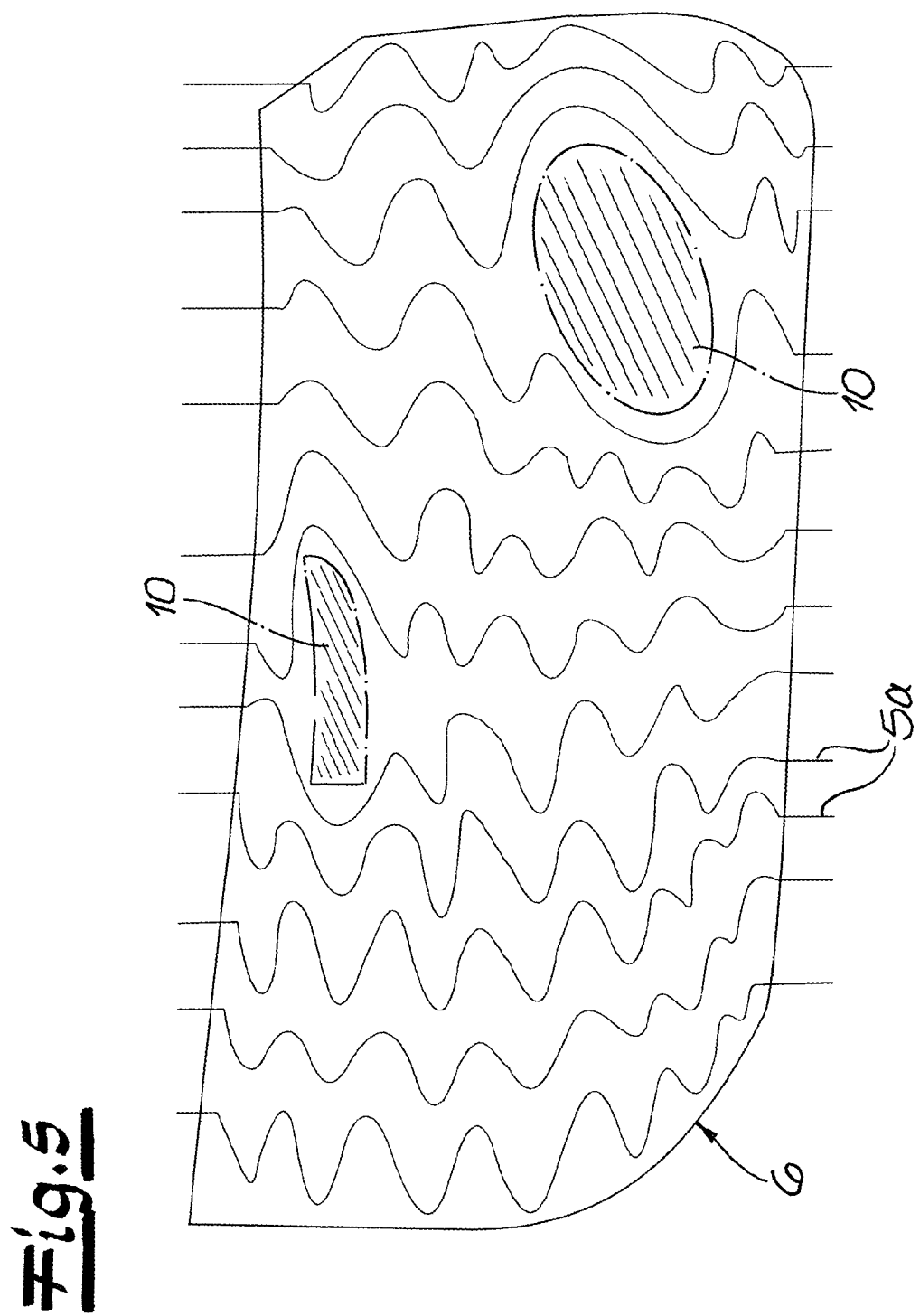

KNITTED SPACER FABRIC FOR USE AS HEATING ELEMENT

FIELD OF THE INVENTION

The present invention relates to a knitted spacer fabric. More particularly this invention concerns such a spacer fabric usable as a heating element.

BACKGROUND OF THE INVENTION

A knitted spacer fabric, particularly for use as a heating element, is known having first and second warp-knitted layers each having wales running in a production direction and rows of stitches running in a transverse direction, and spacer yarns connecting the knitted layers, at least one of the knitted layers having a basic structure that is composed of nonconductive yarns and additional conductive yarns.

Knitted spacer fabrics are characterized by low weight per unit area, a comparatively open and air-permeable structure, and elastic properties in the thickness direction. Knitted spacer fabrics are therefore often used as breathable materials in the manufacture of textiles, as pillow and mattress covers, for seat covers, and in particular as technical textiles in the automotive industry.

A knitted spacer fabric of this generic type is known from DE 10 2006 038 612. The uninsulated conductive yarns extend over at least one of the knitted layers with directly adjacent conductive yarns touching one another. The described configuration forms a flat, conductive structure that can be contacted by two lateral, knitted-in connecting leads. Since all of the conductive yarns form a common electrically conductive structure with a large number of contact points, selective contacting is sufficient in principle. In practice, however, locally uneven or insufficient heating may also occur in some circumstances.

Another knitted spacer fabric of this generic type is known from DE 10 2009 013 250. One of the knitted layers has a basic structure composed of nonconductive yarns, with a plurality of conductive yarns being knitted as heating conductors into the one knitted layer in the production direction. The individual conductive yarns do not touch one another and can also be insulated. It is therefore also necessary to electrically contact each individual conductive yarn at both of its ends in each knitted portion. A connecting lead integrated into the knitted layer itself is provided for this purpose. The connecting conductive yarn runs in the transverse direction at both ends of the knitted portion and is worked in the production direction. The connecting conductive yarn is preferably fed laterally out of the knitted portion and cut there for an electrical connection. The connecting conductive yarn is to be contacted appropriately with the individual conductive yarns in its portions running in the transverse direction.

Another knitted spacer fabric of this generic type is known from DE 42 39 068 where separate terminal contacts are connected to parallel conductive yarns.

While the length of the individual knitted spacer fabrics is predetermined by the course of the connecting conductive yarn in DE 10 2009 013 250, the knitted spacer fabric is formed as a continuous web in DE 10 2006 038 612 and DE 42 39 068, it being possible for knitted spacer fabrics of any size to be cut or punched out and then fitted with contacts.

The approaches described in the prior art have not yet been able to establish themselves to a large extent in practice.

OBJECTS OF THE INVENTION

It is therefore an object of the present invention to provide an improved knitted spacer fabric for use as heating element.

Another object is the provision of such an improved knitted spacer fabric for use as heating element that overcomes the above-given disadvantages, in particular that, in the long term, is also reliably usable as a heating element.

In addition, an object is to provide a method of forming a heating element from the knitted spacer fabric and a heatable interior component for a motor vehicle.

SUMMARY OF THE INVENTION

A knitted spacer fabric has according to the invention a first warp-knitted layer having wales running in a production direction and rows of stitches extending in a transverse direction, a second warp-knitted layer also having wales running in a production direction and rows of stitches extending in a transverse direction, and spacer yarns connecting the knitted layers, at least one of the knitted layers are composed of nonconductive yarns and conductive yarns. The conductive yarns are incorporated into the one knitted layer in some areas in a functional region extending in a production direction and resting on the respective knitted layer in a connection region that extends over a plurality of rows of stitches as a float stitch.

Thus, the inventive knitted spacer fabric can be understood to mean both the corresponding areas of a continuous web and individual pieces of such a continuous web. Due to the inventive division into at least one functional region and one connection region, a corresponding repeat must be taken into account during manufacturing. The size of the individual knitted spacer fabric must therefore be defined and specified in advance for a specific use. Usually, a knitted spacer fabric has two connection regions with the functional region between them as seen in the production direction.

Whereas according to the prior art the conductive yarns are always evenly integrated into the knitted layer in the production direction, this is done according to this invention only in the functional region, it being possible for the conductive yarns to be incorporated into the respective knitted layer either as stitches, in the form of a partial weft, or as a weft insertion or inlay. The conductive yarns are held and protected in the knitted layer by such an insertion.

In addition, at least one connection region is also provided where the conductive yarns lay on the respective knitted layer as a float stitch (also referred to in practice as floating). Such floating is a known knitting technique in which the individual conductive yarns are not included in the stitch formation during the knitting process and are also not placed as a weft or partial weft between the individual stitches. During floating, the conductive yarns rest instead on the respective knitted layer. The float is formed in such a way that the conductive yarns rest upon the respective knitted layer opposite the spacer yarns and are thus accessible from the outside.

Since the conductive yarns rest upon the outside face of the respective knitted layer as a result of the floating and hence on the entire knitted spacer fabric, easy connection to them can be done afterward. The conductive yarn can be bundled in the connection region, for example, and/or they can be connected to a metallic intermediate element in the form of a sheet-metal or film strip, a wire, a braided wire ribbon, or the like. This provides the advantage, for example, that the underlying material is not damaged during soldering, whereas reliable contacting is not possible or is only possible with difficulty in the case of conductive yarns that are integrated into the basic structure.

Even though floating results in considerable advantages with regard to the contacting of the conductive yarns, special care is required when handling the corresponding knitted spacer fabric and during further processing of a heating element formed therefrom, because the additional conductive yarns in the at least one connection region are largely unprotected. With regard to the improved functional characteristics and in particular the possibility of particularly reliable and long-lasting contact, the corresponding disadvantages are consciously accepted within the scope of the invention.

The at least one connection region is to be dimensioned such that contact can be made in the described manner with simple means. Preferably, the connection region and thus the floating of the conductive yarns preferably extends in the production direction over at least 10, preferably at least 20, and especially preferably at least 40 rows of stitches. The length of the connection region in the production direction is typically between 0.5 cm and 15 cm. If, according to a preferred embodiment of the invention, there is a connection region on both sides of the functional section, the parameters mentioned also apply to both connection regions.

As already explained above, a repeat must be taken into account when producing the knitted spacer fabric. The length of the functional section is also determined accordingly during production. Even if the length of the functional section is not subject to any significant restrictions from a technical point of view, a first length of the functional section of between 10 cm and 200 cm and especially preferably between 20 cm and 100 cm is usually selected with respect to the preferred areas of application.

The width of the knitted spacer fabric in the transverse direction is also only limited by the maximum web width during the manufacture of the knitted spacer fabric. However, a multi-use approach is usually taken with regard to the common fields of application, it being possible for the width of the knitted spacer fabric to be between 5 cm and 100 cm, for example.

The thickness of the spacer fabric section is typically between 1 mm and 20 mm, particularly between 3 mm and 7 mm.

In the knitted spacer fabric according to the invention, the additional conductive yarns are provided in at least one of the knitted layers. Additional conductive yarns with different functions can also be provided in both knitted layers. While heating on one side is desirable in an embodiment of the knitted spacer fabric as a heating element, electrical return feed can also be provided on the other side in order to make it overall possible to contact the knitted spacer fabric from one side. In light of this, the preferred embodiments of the two knitted layers will be described separately from one another below. It will be readily understood that the features according to the invention can be provided on both knitted layers or on only one knitted layer.

According to a preferred embodiment of the invention, conductive yarns are present at least in the first knitted layer. In particular, the conductive yarns can be resistive heating conductors, so that a heating function is then performed to the first knitted layer. However, very different requirements may arise even with respect to such an area of application that also result in different possible or preferred configurations.

According to a first approach, the conductive yarns run in a zigzag configuration in the production direction. The advantage then arises that a comparatively large area can be covered by the individual conductive yarns serving as heating conductors. Depending on the requirements to be taken into account, only relatively few heating conductors are necessary in a given area, which also simplifies the contacting thereof overall.

According to a second approach, on the other hand, it can be advantageous if the conductive yarns have only a slight or no stitch offset in the transverse direction along their course in the production direction. For example, depending on the type of conductive yarn used and the loads during use with a pronounced zigzag configuration, a flexural fatigue strength that is unsatisfactory in the long term can result. In addition, particularly in the field of motor vehicles, applications are also known in which the knitted spacer fabric must be able to be torn in a defined manner even when it is being used, in order to release an initially covered airbag, for instance. Where controlled tearing is to take place, there are advantageously no conductive yarns, which increase the tensile strength substantially. Besides a comparatively lesser stitch offset using fewer wales, the conductive yarns can be knitted particularly as a "weft under 1" as well. The conductive yarns then each run along a respective wale and are held by the loops of the basic structure without forming loops themselves.

In the context of the first approach explained above, the conductive yarns of the first knitted layer in the functional region can each be introduced into the knitted layer via a first number of $m>5$ wales. The conductive yarns thus run in a type of zigzag configuration such as that known from above-cited DE 10 2009 013 250 or DE 42 39 068, for example.

This provides the advantage that a large area can be covered by the course of at least five wales with relatively few conductive yarns overall, which also means that fewer conductive yarns have to be contacted overall.

For a single knitted spacer fabric, irrespective of the stitch offset, which is determined depending on the application, it is possible for between 4 and 40, preferably between 5 and 20, especially preferably between 6 and 12 conductive yarns to be provided, but the invention is not restricted to such configurations.

The first knitted layer is preferably provided for the heating function, the first knitted layer then expediently forming an exposed surface to be heated or at least being directly beneath a decorative layer. A good insulating effect is then achieved in a particularly advantageous manner by the spacer yarns in the thickness direction.

If a heating line is present, the first knitted layer can thus be warmed up especially quickly, and the good insulation also enables comparatively high surface temperatures to be achieved. On the other hand, if certain heating rates or surface temperatures are specified, substantially better energy efficiency can be achieved compared to heating elements that are not composed of a knitted spacer fabric.

In the context of the first approach explained above, the spacing between adjacent conductive yarns of the first knitted layer corresponds to a number of n wales along the row of stitches or at least part of the row of stitches. The number n is preferably smaller than the previously mentioned number m. The conductive yarns then engage in the production direction of the knitted spacer fabric in the zigzag shape that is formed with a mutual offset in each case, thus promoting especially uniform and efficient heating.

Alternatively, according to the second approach described above, it is also within the scope of the invention for the number n to be greater than or at least equal to the number m, in which case the conductive yarns are offset relative to one another in the production direction but no longer engage in one another. Such a configuration is useful if the knitted spacer fabric is to be cut or torn along a straight line in the production direction without cutting individual conductive yarns. Such a configuration is fundamentally possible for a wide variety of laying patterns of the conductive yarns. Depending on the offset, however, individual warp guides are expediently not occupied for manufacturing. For example, if the conductive yarns run over a number of m equal to 5 wales, the first warp guide can be occupied by a conductive yarn, while the subsequent four warp guides are kept open. Only a sixth warp guide subsequent thereto is then again occupied by a conductive yarn. This ensures that separation in the production direction is possible between two adjacent conductive yarns.

As already described above, a stitch offset can also be completely dispensed with for the individual conductive yarns, with the effect that the conductive yarns are held as a "weft under 1," for example, by the basic structure of the respective knitted layer. Separation or tearing-open is then possible between all adjacent wales without a resulting increase in the tensile strength due to the conductive yarns.

In a standard manufacturing process, a laying pattern is achieved in the functional region that is uniform both in the production direction and in the transverse direction, independently of the configuration of the warp guides.

However, the invention also includes the possibility of adapting to specific embodiments, it being possible in particular for openings to be provided within the knitted spacing fabric that are free of conductive yarns. The type and shape of these openings can be freely selected, for example in the form of gaps in the spacer textile. In contrast to a uniform laying pattern, the conductive yarns do not have to be severed, but rather can advantageously be flexibly guided around the opening. A different distribution of the conductive yarns can be achieved, for example, by associating the individual conductive yarns with different guide bars.

According to a preferred embodiment of the invention, the conductive yarns of the first knitted layer are each formed by a metal wire that is preferably provided with insulation. In addition to the metal wire, other configurations such as metal braids, conductive plastic yarns, monofilament yarn with a conductive coating, or multifilament yarn with a conductive coating of the individual filaments or with a conductive jacket are also possible, for example. With regard to the heating function and the processing, however, a simple metal wire is especially preferred.

Regardless of the exact design of the conductive yarns, insulation is advantageous in terms of the durability of the spacer fabric. To wit, the knitted spacer fabric can also be exposed to various environmental influences when used as a heating element. Depending on the application the penetration of liquids cannot always be ruled out, for example, in which case the insulation provides protection for the conductive yarns.

The typical thickness of such electrical insulation is between 4 μm and 20 μm, particularly around 10 μm. In particular, the electrical insulation can be formed by a paint coat. Correspondingly insulated metal wires also lend themselves well to processing in a knitting process without damaging the insulation. On the other hand, such insulation is easily removed when the conductive yarns are soldered to the at least one functional region because of the temperature input alone.

In order to achieve the desired heating characteristics and expedient processing of the metal wire, it preferably has a diameter of between 25 μm and 200 μm, especially preferably between 50 μm and 100 μm, with the electrical resistance lying between 1 Ω(ohm)/m and 280 Ω/m (ohms per meter), preferably between 5 Ω/m and 70 Ω/m. The specified diameter refers to the usual wire of circular section. In principle, metal wires can also be used whose cross section is not circular. The cross-sectional area then expediently corresponds to the area of a circular wire with the previously specified diameter.

According to another aspect of the present invention, conductive yarns are present at least in the second knitted layer, with the conductive yarns or at least a portion of the conductive yarns in the functional region being integrated into the second knitted layer over a first width determined in the transverse direction, and with the conductive yarns or a portion of the conductive yarns of the second knitted layer as viewed in the transverse direction adjoining a second width in both directions that is greater than the first width and free of conductive yarns. While the first knitted layer is to be associated with a heating function in the embodiment described above, the second knitted layer can be used for the electrical connection. In particular, if the knitted spacer fabric is to be connected to a power supply only on one edge in its production direction, then an electrical return must be provided, which can then be integrated into the second knitted layer. A type of connector cable is then formed in the second knitted layer that is integrated into the knitted layer at least in the functional region.

In the context of one especially simple embodiment, the corresponding conductive yarns of the second knitted layer that are provided as connecting leads can be inserted as a type of weft insertion into the stitches or between the stitches of the basic structure of the second knitted layer. The conductive yarns that are provided as connecting leads are then held and protected in the second knitted layer.

The conductive yarns of the second knitted layer can be preferably formed from metal braid, the conductive yarns of the second knitted layer also being preferably provided with insulation in order to achieve better protection against external influences and/or against short circuits.

As already remarked previously, the conductive yarns of the second knitted layer can be guided substantially straight in the production direction as a kind of weft insertion. It should also be borne in mind here that the conductive yarns of the second knitted layer generally have a higher strength compared to the basic structure of the second knitted layer as well as compared to the first knitted layer. This is particularly true if the conductive yarns of the second knitted layer are composed of wire braid. If incorporated securely enough into the second knitted layer, the conductive yarns of the second knitted layer can also serve as a type of tension limiter in order to prevent excessive stretching of the overall knitted spacer fabric. According to the embodiment described above, for example, if the first knitted layer has thin conductive yarns that tear comparatively quickly, the higher tensile-strength conductive yarns of the second knitted layers enable an especially advantageous level of stabilization to be achieved.

On the other hand, a certain stretchability of the knitted spacer fabric is also desirable for certain applications in order to enable it to be shaped and adapted to a certain extent. If the knitted spacer fabric is used as a heating element, the knitted spacer fabric is often drawn onto a three-dimensionally curved and/or angled support, to which end sufficient flexibility is then necessary in order to enable a corresponding shape adaptation without puckering and excessive kinks.

In light of this, in order to achieve flexibility despite the high tensile strength of the conductive yarns of the second knitted layers, the conductive yarns of the second knitted layer can also run in a zigzag pattern in the production direction. Due to the running width of this zigzag shape in the transverse direction, the flexibility or stretchability provided in the production direction can also be set or adjusted according to requirements.

The invention also relates to a method of forming a heating element from the knitted spacer fabric described above, with electrical contacting, particularly by soldering, taking place in the connection region or the usually two connection regions on both sides of the functional region. For example, a film, a metal sheet, a braided wire ribbon, or also a wire in the connection region on the first knitted layer and/or the second knitted layer can be inserted between the corresponding conductive yarns and the corresponding knitted layer.

Alternatively, in a particularly advantageous manner, there is also the possibility of cutting out the connection region below the conductive yarns, thereby creating a free space there. By cutting out the basic structures of the two knitted layers with the spacer yarns arranged therebetween, only the conductive yarns of the first and/or second knitted layer remain there.

According to a preferred embodiment, if the first knitted layer has heat conductors and the second knitted layer has connecting leads in the manner described, these can then also be contacted with one another in an especially simple manner or provided with a power connection. With regard to the heating element to be formed, the contacted regions can then be folded down so that they are finally protected by the remaining knitted spacer fabric when the heating element is used.

According to the method of forming the heating element, preferably the knitted spacer section is between a cover layer and a substrate. The cover layer can be leather or synthetic leather, for example, or also another type of cover fabric. The substrate can be a plastic carrier, a foam core, or the like.

Finally, the invention also relates to a heatable interior component for a motor vehicle with the knitted spacer fabric described above.

The heatable interior component can augment the comfort and efficiency during use of a motor vehicle.

In conventional internal-combustion engines, the interior is usually heated with the waste heat of the internal combustion engine by a blower, with the entire interior being heated. It should be noted that very large volumes often have to be heated, which are also in contact with a cold environment via the outer skin of the motor vehicle.

It is also known in conventional motor vehicles to heat steering wheels and seats in order to enhance comfort. In addition, initial attempts are being made at heating up armrests and side panels for enhanced comfort. This approach is based on the discovery that the subjective feeling of warmth is ultimately decisive for user's sense of well-being.

While the legs and the upper torso are usually covered by clothing, direct contact with a cold environment results in an unpleasant feeling of cold, especially in regions of the body that are in contact with a seat or an armrest. The same applies to the hands on the steering wheel and shift lever, for example.

Especially when these regions are heated "close to the body" for a user, a pleasant feeling of warmth can be generated despite an overall low ambient temperature. This then even results in the advantage that strong air flows by a fan heater can be avoided or at least reduced. It should also be noted that, particularly when the vehicle is still cold, the fan initially sets cold air in motion.

Especially with regard to improved energy efficiency, it is advantageous if the sense of well-being of a user of a motor vehicle can be achieved with an overall lower ambient temperature. Through heating close to the body, it is not necessary for the entire interior to be brought to a high temperature, which results in considerable losses. Especially good energy efficiency is of particular importance with regard to lower fuel consumption or particularly in the case of electric vehicles.

Increased use of heated interior components is therefore not only expedient for luxury class vehicles, but particularly for compact and small cars as well. Besides steering wheels and seats, additional interior components that touch the body, such as arm supports, shift levers, side parts, headliners, or instrument panels can also be provided with a heating function.

As already remarked previously, one preferred embodiment of the invention relates to a heating system in the form of a knitted spacer fabric with a first knitted layer and a second knitted layer, each having wales running in the production direction and rows of stitches running in the transverse direction, and with nonconductive spacer yarns connecting the knitted layer, the knitted layers each having a basic structure that is composed of nonconductive yarns, and the first knitted layer having, in addition to the basic structure, conductive yarns as heating conductors, which preferably run in a zigzag pattern in the production direction. In the context of the especially preferred embodiment described, the second knitted layer has at least one conductive yarn that is technically integrated into the basic structure as the connecting lead, in which case, according to a further aspect of the invention, the electrical resistance of all of the heating conductors is at least three times the electrical resistance of the connecting lead or of all connecting leads that are provided in the second knitted layer.

If a plurality of connecting leads are provided, these are usually connected parallel to one another. The same applies to the heating conductors that are provided in the first knitted layer. The electrical resistance of all of the heating conductors is especially preferably at least three times, preferably five times, especially preferably ten times, particularly twenty times as great as the electrical resistance of the connecting leads. In the context of the described configuration, the voltage drop and thus the electrical power are present at the heating conductors, whereas there are no substantial electrical losses through the connecting lead or leads. Accordingly, while the first knitted layer is being heated, there is no significant heating in the second knitted layer, and good insulation is also achieved by virtue of the spacer yarns.

The heating conductors are then contacted with the at least one heating conductor at a first end of the spacer fabric in the connection region described above as seen in the production direction. An electrical connection for a supply line can then be provided at a second end of the spacer fabric corresponding to a second connection region. For example, a two-pole plug can be provided, in which case the heating conductors are connected to a first pole and the at least one connecting lead are connected to the second pole.

In the context of the described embodiment, the heating element can be contacted with particular ease on one side. This represents an advantage for many interior components that are only accessible from one side. This applies to an interior component in the form of an armrest, for example.

The fact that the at least one connecting lead is integrated into the second knitted layer from the start means that no additional cables have to be laid that can then be damaged during maintenance and/or perceived by a user when the heating element is in use.

If a plurality of connecting leads are provided in the second knitted layer, these run, as described above, only over a portion of the width of the knitted spacer fabric as determined in the transverse direction. A plurality of connecting leads can be provided as a type of strip, for example, that extends over less than 20% and particularly less than 10% of the width.

In the embodiments specifically described above, a functional region is preferably arranged in a knitted spacer fabric between two connection regions having a floating of the conductive yarns. As a matter of principle, however, other configurations differing therefrom are also possible.

According to one advantageous alternative embodiment, a provision is made against this backdrop that two functional regions that are interrupted by a connection region are provided in at least one of the knitted layers in a knitted spacer fabric, so that a total of three connection regions and two functional regions are then present in the corresponding knitted layer. Specifically, an embodiment is conceivable in which such a division is realized in the second knitted layer for the conductive yarns that are provided as connecting leads. The corresponding conductive yarns of the second knitted layer that are provided as connecting leads can then be appropriately contacted at the two connection regions lying on the outside in the production direction with the conductive yarns of the first knitted layer that are provided in particular as heating conductors, in which case it is then possible for the connecting leads to be severed at the float and contacted with a plug, for example, in the connection region lying between the functional regions in the second knitted layer. In the context of such a configuration, an electrical connection at a single point is also possible, but this connection point is then placed in a central region of the knitted spacer fabric.

Furthermore, configurations are also possible within the scope of the invention in which conductive yarns, particularly in the form of heating conductors, are only present in the first knitted layer, with separate connecting leads running in the production direction being dispensed with and with contacting being possible from only one side nevertheless. In this way, the conductive yarns of the first knitted layer can be divided into two groups, each of which is contacted separately on the same side of the knitted spacer fabric, for example, in order to enable connection to a positive pole and a negative pole. The two groups formed are then electrically connected to one another at the opposite end of the knitted spacer fabric, to which end floating provided there can be used.

In the transverse direction, the individual conductive yarns that are provided as heating conductors can be provided alternately as forward and return conductors, for example, and connected to one another in pairs. A double-length heating conductor is then formed between the positive and negative poles.

In addition to the respective contacting by pairs of exactly two conductive yarns, the two groups of conductive yarns formed opposite the connection can also all be conductively interconnected in a parallel arrangement. If one of the heating conductors is or becomes inoperable, only that one fails, while the current flow in the opposite direction can be divided among all of the heating conductors in the complementary group.

According to another possible embodiment, it is also possible to provide different conductive yarns in one knitted layer, particularly in the first knitted layer. For example, heating conductors and connecting leads can also be incorporated into the first knitted layer in the context of such an embodiment. In this case, these at least two groups of different conductive yarns are expediently respective with different guide bars during the knitting process, so that an optimized knitting pattern can be selected in each case.

BRIEF DESCRIPTION OF THE DRAWING

The above and other objects, features, and advantages will become more readily apparent from the following description, reference being made to the accompanying drawing in which:

FIG. 2 is a top view of the knitted spacer fabric according to FIG. 1 showing a first knitted layer;

FIG. 3 is a view like FIG. 2 with a view from below, i.e. of a second knitted layer of the knitted spacer fabric;

FIGS. 4A-4E are schematic views of different laying patterns;

FIG. 5 shows a flexible laying pattern that is adapted to a cutout;

SPECIFIC DESCRIPTION OF THE INVENTION

As seen in FIG.

Figure 1:
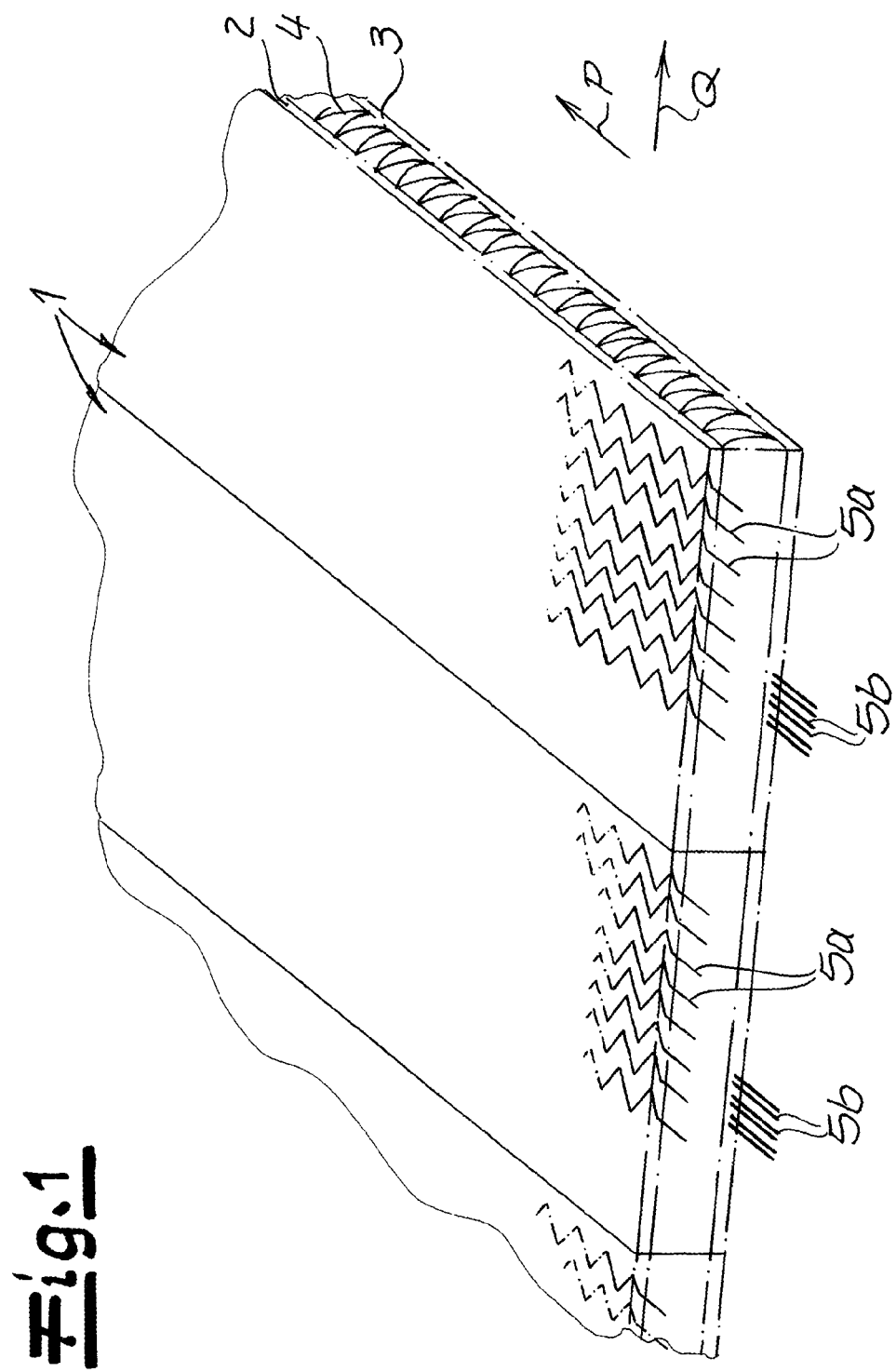
FIG. 1 shows a detail of a warp-knitted spacer fabric from which individual knitted spacer fabrics can be separated.

FIG. 1 shows a knitted spacer fabric that can be cut up into individual knitted spacer fabrics 1 (see also FIG. 2). As will be described in detail below, the individual knitted spacer fabrics 1 are provided for use as a heating element. As usual, the knitted spacer fabrics 1 have a first knitted layer 2 and a second knitted layer 3, each having wales running in a production direction P and rows of stitches running in a transverse direction Q. The knitted layers 2 and 3 are connected by transverse space yarns 4. The structure described corresponds to the usual design of a knitted spacer fabric.

Taking this as a point of departure, both knitted layers 2 and 3 have a basic structure that is composed of nonconductive yarns and additional conductive yarns 5a and 5b.

The conductive yarns 5a of the first knitted layer 2 are provided as heating conductors and extend over more than half of the width of the knitted spacer fabric 1. In order to make a bow-shaped cutout 6 possible there such as is also shown in FIG. 2, a edge strip of the individual knitted spacer fabrics 1 is not covered with the conductive yarns 5a of the first knitted layer 2 in the transverse direction Q.

In contrast, the conductive yarns 5b of the second knitted layer 3 form connecting leads.

It can be seen from a comparative view of FIGS. 1 and 2 that the individual knitted spacer fabrics 1 have different regions in the production direction. According to FIGS. 2 and 3, for instance, the conductive yarns 5a and 5b of the two knitted layers 2 and 3 are integrated in some areas of a functional region 7 into the respective knitted layer 2 or 3 in the production direction P, particularly so as to form stitches as a standing yarn or preferably as a partial weft.

In the production direction P, there is a connection region 8 at each of each functional region 7 and extending over a plurality of typically at least 10 rows of stitches, for example between 20 and 100 rows of stitches, the conductive yarns 5a and 5b floating on the respective knitted layer 5a, 5b [2 and 3] in the connection region 8 as a float stitch. Consequently, the conductive yarns 5a and 5b are not incorporated into the base structure in the connection region 8, so that engagement between the conductive yarns 5a and 5b and the respective base structure can occur there.

For example, a sheet-metal strip, a strip of a metal film, a braided wire ribbon, or also a wire can be introduced there in order to then contact the conductive yarns 5a and 5b. Additionally or alternatively, the basic structure of the two knitted layers 2 and 3 with the spacer yarns 4 therebetween can also be cut away at the connection regions 8. Then, only the conductive yarns 5a and 5b, which can be contacted as described above with a separate element or directly, are left there.

With regard to the knitted spacer fabrics 1 shown in FIGS. 2 and 3, for example, the conductive yarns 5a of the first knitted layer 2 can be connected to the conductive yarns 5b of the second knitted layer 3 in one of the connection regions 8. For example, a two-pole plug can be provided in the other connection region 8, in which case a first pole is contacted with the conductive yarns 5a of the first knitted layer 2 and a second pole is contacted with the conductive yarns 5b of the second knitted layer 3 that are provided as connecting leads.

The measures described ensure that a single knitted spacer fabric 1 can be connected from one side to a power and voltage supply, a heating effect being achieved in the first knitted layer 2 by the large number of conductive yarns 5a that are provided as heating conductors, whereas the conductive yarns 5b of the second knitted layer 3 are provided as a return line.

In FIG. 2, the knitted spacer fabrics 1 each have an intermediate connection 9 to the connection region 8 in which the conductive yarns 5a and 5b are in turn integrated into the respective basic structure of the first knitted layer 2 and/or of the second knitted layer 3. This fixes the conductive yarns 5a and 5b there at least to a certain extent. According to the variant described above, if the basic structures of the first knitted layer 2 and of the second knitted layer 3 with the interposed spacer yarns 4 are cut out, the area of the insertion 9 then usually remains in order to hold the conductive yarns 5a and 5b at that location. The corresponding sections can be optionally folded over or cut off later.

In the illustrated embodiment, eight conductive yarns 5a are provided as an example for the first knitted layer 2. The number of conductive yarns 5a of the first knitted layer 2 can be between four and forty, for example.

It can also be seen that the conductive yarns 5a of the first knitted layer 2 in the functional region 7 each extend over a first number of m>5 wales. It can be seen particularly from the partial enlargement of FIG. 2 that the conductive yarns 5a of the first knitted layer 2 run parallel to one another in a zigzag pattern, with the spacing between adjacent conductive yarns 5a of the first knitted layer 2 corresponding to a second number n of wales, the second number n being less than the first number m. Accordingly, the individual conductive yarns 5a engage in one another during their zigzag movement without touching or intersecting.

In this embodiment, the conductive yarns 5a of the first knitted layer 2 are formed by a metal wire provided with insulation and has a diameter of 50 μm, for example, and a resistance of 20 Ω/m (ohms per meter), for example. The conductive yarns 5a of the first knitted layer 2 are connected in parallel to one another, and the described zigzag movement and the mutual engagement make particularly uniform surface heating possible with only a few conductive yarns 5a. This also means that comparatively few conductive yarns 5a need to be contacted in the two connection regions 8.

The conductive yarns 5b provided as connecting leads in the second knitted layer 3 have a substantially lower resistance than the conductive yarns 5a of the first knitted layer. In this embodiment, wire braids are provided for the second conductive yarns 5b that can for example have a resistance of typically 1 Ω/m (ohm per meter). For this purpose, seven individual wires each with a diameter of 70 μm can be formed for example into a braid.

FIG. 3 shows the spacer fabric with the individual knitted spacer fabrics 1 in a view from below, i.e. in a view of the second knitted layer 3. In principle, the conductive yarns 5b of the second knitted layer 3 can be inserted straight as a kind of stationary yarn in or between the stitches of the basic structure of the second knitted layer 3. In the embodiment illustrated in FIG. 3 however the conductive yarns 5b of the second knitted layer 3 also run in a zigzag pattern, to which end the corresponding conductive yarns 5b are inserted as a partial weft. The conductive yarns 5b are inserted in the manner of a strip running in the production direction. The conductive yarns 5b extend in the functional region 7 over a first width b, extending in the transverse direction Q, the conductive yarns 5b of the second knitted layer 3 as seen in the transverse direction Q being flanked on both sides by a strip of a second width $b_2$ or $b_2$' that is greater than the first width $b_1$, with no conductive yarns 5b being provided there.

The transverse thickness of the spacer fabric is typically between 1 mm and 20 mm, particularly between 3 mm and 7 mm.

With regard to the preferred applications as a heating element in a heatable interior component for a motor vehicle, the functional region 7 extends in the production direction P over a first length 11 typically between 10 cm and 200 cm, the two connection regions 8 extending in the production direction P over a second length 12 of between 0.5 cm and 15 cm, typically between 2 cm and 10 cm. The entire width of the knitted spacer fabric 1 is typically between 5 cm and 100 cm.

FIGS. 4A to 4E show different laying patterns in which the conductive yarns are mutually offset and do not engage one another. As a result, the spacer fabric can be separated along a straight line running in the production direction P without cutting individual conductive yarns 5a. According to FIG. 4A, the conductive yarns 5a are only introduced over a number of m=1 wales, while the spacing between two immediately adjacent conductive yarns 5a is also a number of n=1 wales. This enables each warp guide to be provided with a conductive yarn 5a during production, so that the greatest possible heating power can be achieved both in the production direction P and in the transverse direction Q.

Figure 4B:
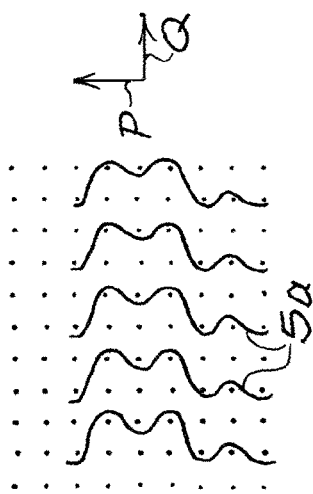
Figure 4D:
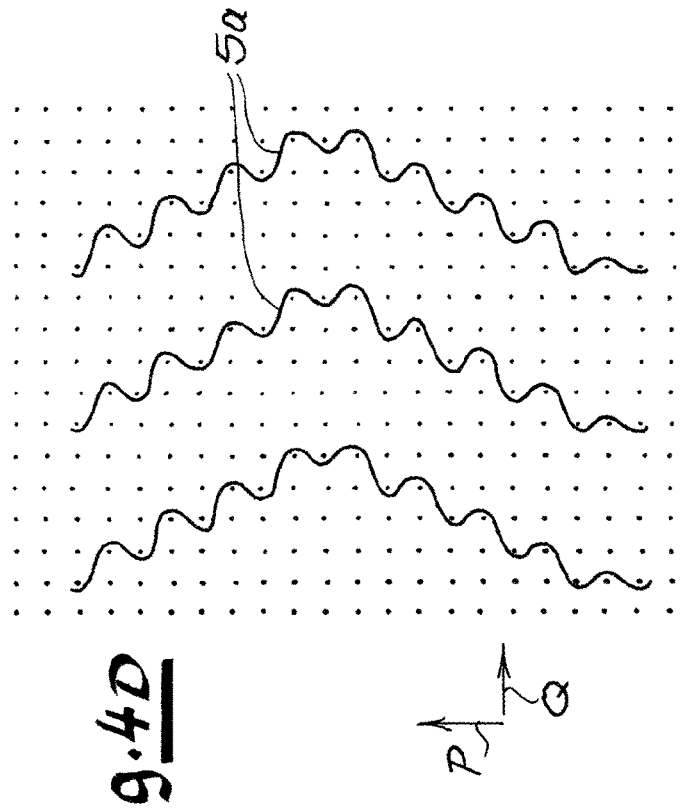
Figure 4A:
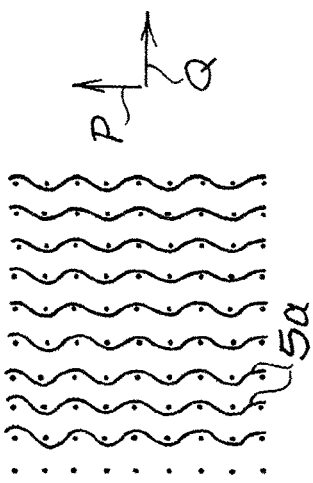
Figure 4C:
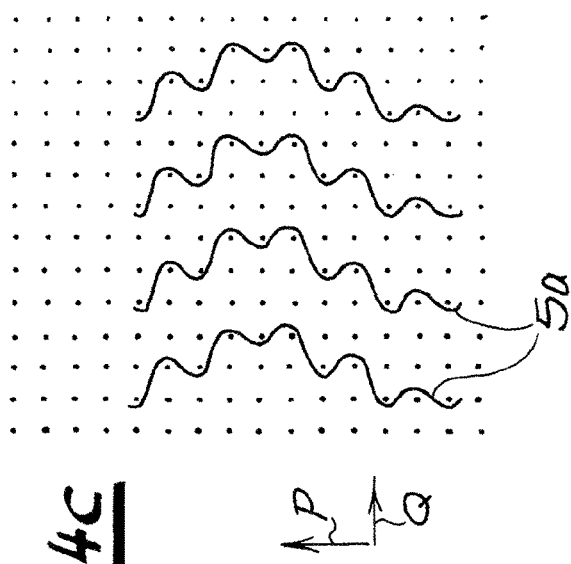

According to FIG. 4B, each conductive yarn 5a runs over a maximum of two wales, so that only every other warp guide is provided with a conductive yarn 5a in the course of manufacturing. FIGS. 4C to 4E show alternative configurations in which either only every third, every fifth, or every thirteenth warp guide is occupied, with the individual conductive yarns 5a then being able to extend over three, five, or thirteen wales.

In principle, it is of course also conceivable for the individual conductive yarns 5a to extend over fewer wales while the occupancy remains the same, but in that case the effective heating power in the transverse direction Q is not optimally exploited. Making the number m equal to the number n, ensures on the one hand that a separation along a straight line running in the production direction P is possible, while at the same time the heating power is optimally distributed in the transverse direction Q.

FIG. 5 shows a cutout 6 with two hatched openings 10 that are free of conductive yarns 5a. These openings 10 can either be simple unoccupied areas or also cutouts of the knitted spacer fabric. The conductive yarns 5a are knitted into the blank 6 in such a flexible manner that the cutouts 10 are free of conductive yarns 5a on the one hand and none of the conductive yarns 5a are severed on the other hand.

Both in FIGS. 4A to 4E and in FIG. 5, only the conductive yarns 5a are shown for the sake of clarity, with the considerations described in this regard also applying in like manner to the conductive yarns 5b.

Figure 6:
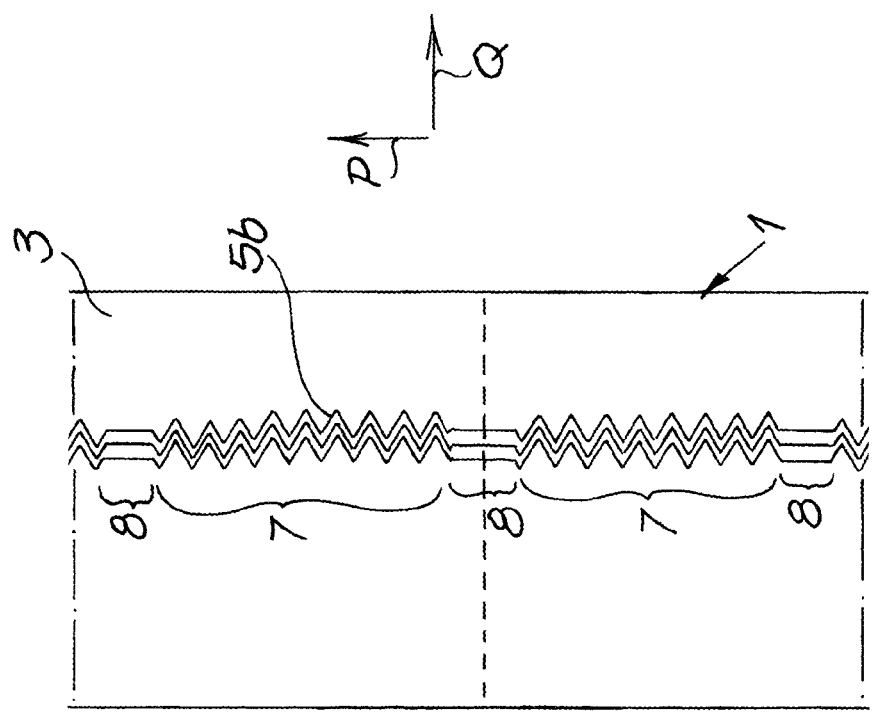
FIG. 6 is a top view of the second knitted layer of an alternative embodiment of a knitted spacer fabric.

FIG. 6 shows an alternative embodiment of a knitted spacer fabric 1 in a plan view of the second knitted layer 3. The first knitted layer 2 can be embodied as shown in FIG. 2.

While a functional region 7 is provided between two end connection regions 8 in both knitted layers 2 and 3 for each knitted spacer fabric 1 in the embodiments described above, an additional middle connection region is provided in the second knitted layer 3 according to FIG. 6, so that two functional areas 7 result accordingly that connect on both sides of the additional central connection region 8. By virtue of the additional connection region 8 in the middle, contact can also be made there with an electrical connection within the scope of the configuration described, for example a positive and negative pole The electrical connection of the knitted spacer fabric 1 as a heating element therefore does not occur at the ends of the knitted spacer fabric 1 in the production direction P, but rather in a central region. In contrast, the connection regions 8 lying to the outside in the production direction are used for contacting the conductive yarns 5a of the first knitted layer 2 provided as heating conductors with the conductive yarns 5b of the second knitted layer 3 provided as connecting leads.

It is also clear that, with regard to FIG. 6, the position of the conductive yarns 5b of the second knitted layer 3 that function as connecting leads can also be varied in the transverse direction Q according to the respective requirements.

Figure 7:
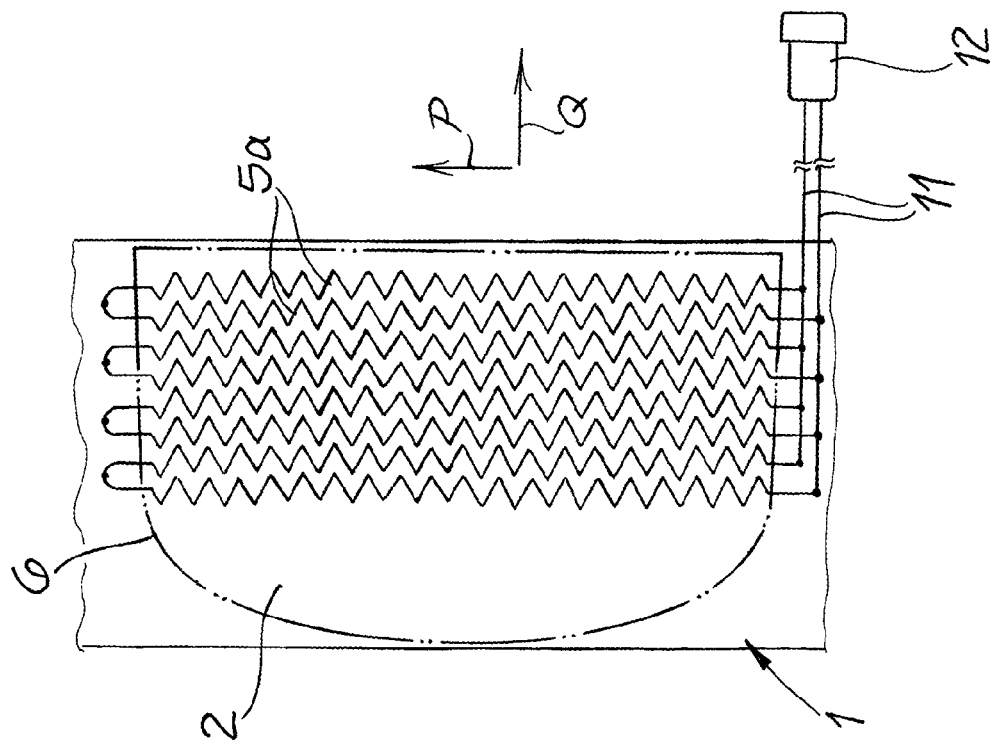
FIG. 7 is a top view of the first knitted layer of another alternative embodiment of a knitted spacer fabric.

FIG. 7 shows another alternative embodiment of a knitted spacer fabric 1 in a plan view of the first knitted layer 2, with conductive yarns 5a only being present in the first knitted layer 2 in the context of this alternative embodiment. The previously described conductive yarns 5b in the second knitted layer 3 are omitted. According to FIG. 7, the conductive yarns 5a are divided into two groups each contacted by a respective connecting lead 11. By way of example, the two connecting leads 11 are connected to the two poles of a plug 12 in FIG. 7. The conductive yarns 5a of the first knitted layer, which are provided as heating conductors, are each connected in pairs, so that heating conductors with a double length are ultimately formed between the two connecting leads 11 as a result of the connection.

According to FIG. 7, the conductive yarns 5a are each connected exactly in pairs, so that each is either a forward or return conductor. Alternatively, according to FIG. 7, instead of a connection by pairs of the individual conductive yarns 5a, all of the conductive yarns 5a situated opposite the two connecting leads 11 can all be contacted collectively. If an interruption then occurs in a group (forward or return line) of the conductive yarns 5a, only this individual conductive yarn 5a fails, while the current flow in the opposite direction remains ensured by the parallel connection.

It can be seen according to FIG. 7 that a forward and return line of the electric current is also possible only on the first knitted layer 2 when connecting on one side of the knitted spacer fabric 1. In the context of another alternative embodiment (not shown), it is also possible in principle for different types of conductive yarns 5a to be provided, preferably with a different laying pattern. For example, both comparatively thin heating wires and, in addition, connecting leads with a lower resistance can be provided in the same knitted layer 2 or 3. Such different conductive yarns 5a can be arranged alternately, and groups can be arranged separately from one another in the transverse direction Q.

We claim:

1. A knitted spacer fabric comprising:
a first warp-knitted layer having wales running in a production direction and rows of stitches extending in a transverse direction;
a second warp-knitted layer also having wales running in the production direction and rows of stitches extending in the transverse direction, and
spacer yarns connecting the first and second knitted layers,
at least one of the first and second knitted layers having a plurality of nonconductive yarns and a plurality of conductive yarns,
at least one of the first and second knitted layers having a plurality of functional regions and a plurality of connection regions alternating in the production direction,
the conductive yarns of the one knitted layer being incorporated into the one knitted layer in a plurality of longitudinally spaced functional regions and extending in the functional regions in the production direction and the conductive yarns are resting on the one knitted layer in a plurality of longitudinally spaced connection regions and each of the conductive yarns are extending over a plurality of rows as float stitches, and
a respective connecting line or lead extending transversely across each of the connection regions in electrical contact with the conductive yarn float stitches.

2. The knitted spacer fabric according to claim 1, wherein the connection region extends over at least ten rows of stitches.

3. The knitted spacer fabric according to claim 1, wherein conductive yarns are arrayed in the first knitted layer across a first number m>5 wales thereof.

4. The knitted spacer fabric according to claim 1, wherein the conductive yarns are arrayed in the first knitted layer across a first number m of wales, and, along the rows of stitches, a spacing between adjacent conductive yarns of the first knitted layer corresponds to a second number n of wales, the second number n being greater than the first number m.

5. The knitted spacer fabric according to claim 1, wherein the conductive yarns are each formed by a metal wire provided with insulation.

6. The knitted spacer fabric according to claim 5, wherein the metal wire has a diameter of between 25 µm and 200 µm and a resistance of between 1 Ω/m and 280 Ω/m.

7. The knitted spacer fabric according to claim 1, wherein the conductive yarns are in the second knitted layer, the conductive yarns or at least a portion of the conductive yarns of the second knitted layer in the functional region being integrated into the second knitted layer over a first width extending in the transverse direction, the conductive yarns or a portion of the conductive yarns of the second knitted layer as viewed in the transverse direction adjoining a second width in both directions that is greater than the first width and free of conductive yarns.

8. The knitted spacer fabric according to claim 5, wherein the conductive yarns of the second knitted layer are formed by wire braid.

9. The knitted spacer fabric according to claim 1, wherein a thickness of the spacer fabric is between 1 mm and 20 mm.

10. The knitted spacer fabric according to claim 1, wherein the functional region extends in the production direction over a first length of between 10 cm and 200 cm and the connection region extends in the production direction over a second length of between 0.5 cm and 15 cm.

11. The knitted spacer fabric according to claim 1, wherein a width of the spacer fabric is between 5 cm and 100 cm.

12. A method of forming a heating element from a knitted spacer fabric according to claim 1, the method comprising the step of:
   electrically connecting to the conductive yarns in the connection region.

13. The method according to claim 12, further comprising the step of:
   cutting out at least a portion of the connection region underneath the conductive yarns.

14. The method according to claim 12, further comprising the step of:
   laminating the knitted spacer fabric between a cover layer and a substrate.

15. Use of the knitted spacer fabric according to claim 1 as a heating element.

16. The knitted spacer fabric according to claim 1, wherein the conductive yarns extend parallel to one another.

* * * * *